(12) United States Patent
Hoang et al.

(10) Patent No.: US 12,437,550 B2
(45) Date of Patent: Oct. 7, 2025

(54) METHOD FOR COUNTING PASSENGERS OF A PUBLIC TRANSPORTATION SYSTEM, CONTROL APPARATUS AND COMPUTER PROGRAM PRODUCT

(71) Applicant: Hitachi, Ltd., Tokyo (JP)

(72) Inventors: Trung Hoang, London (GB); Donato Di Paola, London (GB); Anthony Ohazulike, London (GB)

(73) Assignee: Hitachi, Ltd., Tokyo (JP)

( * ) Notice: Subject to any disclaimer, the term of this patent is extended or adjusted under 35 U.S.C. 154(b) by 344 days.

(21) Appl. No.: 18/130,513

(22) Filed: Apr. 4, 2023

(65) Prior Publication Data
US 2023/0351761 A1 Nov. 2, 2023

(30) Foreign Application Priority Data
Apr. 28, 2022 (EP) .................................. 22290021

(51) Int. Cl.
| | | |
|---|---|---|
| *G06V 20/56* | (2022.01) | |
| *G06T 7/20* | (2017.01) | |
| *G06T 7/70* | (2017.01) | |
| *G06V 10/25* | (2022.01) | |
| *G06V 10/70* | (2022.01) | |
| *G06V 40/10* | (2022.01) | |

(52) U.S. Cl.
CPC ................ *G06V 20/56* (2022.01); *G06T 7/20* (2013.01); *G06T 7/70* (2017.01); *G06V 10/25* (2022.01); *G06V 10/70* (2022.01); *G06V 40/10* (2022.01); *G06T 2207/20024* (2013.01); *G06T 2207/20081* (2013.01); *G06T 2207/20084* (2013.01); *G06T 2207/30196* (2013.01); *G06T 2207/30242* (2013.01); *G06T 2207/30252* (2013.01)

(58) Field of Classification Search
CPC . G06T 2207/10016; G06T 2207/20081; G06T 2207/20084; G06T 2207/30196; G06T 2207/30232; G06T 2207/30242; G06T 7/248; G06T 7/97; G06T 7/0002; G06V 10/761; G06V 20/52; G06V 20/56; G06V 40/10; G06V 40/103
See application file for complete search history.

(56) References Cited

U.S. PATENT DOCUMENTS

2020/0134875 A1* 4/2020 Yi ........................... G06F 18/13
2020/0380252 A1* 12/2020 Ding .................. G06Q 30/0609

FOREIGN PATENT DOCUMENTS

CN 110070061 A * 7/2019 ........... G08G 1/0145

* cited by examiner

*Primary Examiner* — Twyler L Haskins
(74) *Attorney, Agent, or Firm* — Crowell & Moring LLP

(57) ABSTRACT

Method for counting the number of persons being at a predefined location before entering a transportation vehicle 1, wherein the method includes the steps of receiving images taken by one or more cameras 2a, 2b mounted at the transportation vehicle 1 and performing for each image processing steps of, wherein the method further comprises track boundary boxes BB of each detected person in all received images and count the number of persons.

11 Claims, 7 Drawing Sheets

METHOD FOR COUNTING PASSENGERS OF A PUBLIC TRANSPORTATION SYSTEM, CONTROL APPARATUS AND COMPUTER PROGRAM PRODUCT

The present invention relates to a method, a computer program product for carrying out the method by a computer as well as a control apparatus and a system including the control apparatus which enable enhanced image processing which is used for a more reliable detection and counting of persons/passengers of a public transportation system.

BACKGROUND

Existing methods for counting passengers of public transportation system based on image processing exploit fixed camera systems at a static infrastructure. These systems, however, suffer from crowded scenes and the resulting occlusion when it comes to computerized image processing and people counting. Although patent literature 1 provides a method in which, instead of static infrastructure, mobile sensors are used, there is still need for improving the counting of persons by computerized image processing. Especially improvement is needed in view of reliably avoiding occlusion effects and mis-tracking of previously identified/detected persons/people. In other words, even though computer vision and machine learning based systems have become available which are already powerful at detecting and tracking detected persons, the problem of occlusion and mis-re-identification of detected persons is not yet addressed sufficiently.

In particular, patent literature 1 (CN 110070061 A) uses statistical measures captured from mobile or static cameras at public transportation stations or mounted at a transportation vehicle for comparing actual photos with historical photos based on which, for example by similarity analysis, the number of people can be counted. However, when it comes to using historical distributions and historical parameters, the choice of time or of the time period significantly affect the results and thus can lead to a decreased reliability of the counting. Further, the similarity analysis is difficult to scale due to the number of photos increasing significantly when the number of people at a station increases and the method of similarity comparison can lead to errors due to the fact that people have different outfits and postures, and appear across different stations and times. Further, patent literature 1 does not properly address occlusion effects leading to possible inaccuracies of the counting of persons and it does not combine and compare extracted features of detected persons among all received/captured images which can lead to incorrect re-identifications of previously detected persons (mis-re-identifications).

Problem

Hence, the problem to be solved is to provide an improved method, computer program product, control apparatus and system which is in particular improved in view of accuracy and reliability of counting persons by an enhanced image processing. This is solved by the appended independent claims and preferred developments are provided by the dependent claims.

As a general remark, the above problem and in particular the aspects of occlusion and mis-re-identification are addressed by the present application and the claimed subject matter by using at least one or preferably more than one camera mounted (on board) on a transportation vehicle, such as a railway vehicle, a tram, a subway, a bus, or the like. It is noted that the present disclosure will use the term "camera", however, other systems, such as LIDAR sensors or other, e.g., optical sensors may be used instead of a camera. The camera captures images continuously within a predefined area(s) around a predefined location(s). Predefined locations are preferably stations of a transportation system, however, other locations are also included in the scope of this application. Preferably, the transportation vehicle or the control apparatus, preferably provided within the transportation vehicle, is connected to or includes a localization system based on systems such as GPS, Galileo and the like.

The triggering of starting to capture images can be performed by the position of the transportation vehicle, e.g. the taking of images can be started automatically upon a control signal from the control apparatus to the camera(s) when the transportation vehicle has approached a predefined location so that it is within/at a predefined distance to the predefined location. The end of taking images can also be automatically triggered when, e.g., the transportation vehicle stops at the predefined location. With the moving camera(s) mounted on the running transportation vehicle, it is possible to capture a wide range of angles of the predefined location so that the passengers are exposed to be captured by the camera at least in some images without being blocked/occluded. This effectively avoids occlusion. Once detected persons are accurately tracked over the captured images by the present disclosure which reliably avoids unwanted mis-re-identification, too. The mis-re-identification in particular is furthermore reliably avoided by applying a window(s) of interest which has a specific technical function and technical benefit of filtering out passengers which could likely lead to a mis-re-identification during the image processing.

In other words, applying predefined filtering condition(s), a window of interest in each of the captured images and using a series of images received from the one or more cameras during the approaching of a station until the stop of the transportation vehicle, occlusion effects and mis-re-identification effects can be reliably avoided so that an enhanced and improved image processing is enabled, especially image processing which enables accurate counting of persons/passengers located at a predefined location. The window of interest may be explained, e.g., as follows in the context of the present disclosure: The window of interest can be considered as kind of constraints exerted onto image processing to yield better people detection and tracking accuracy. For example, a black bold rectangle in FIG. 4B indicates the window of interest Preferably, the data being processed by the method, the computer program product and/or the control apparatus, preferably arranged within the transportation vehicle, can be transmitted via a wireless data connection to a remote computer/server which includes a database for receiving the determination data, wherein the data being provided in the database of the server can be used for web-based applications showing monitoring and analysis results to a user of the web-based application. The data can then be used for timetable optimization, traffic light synchronization, infrastructure planning, and/or energy usage optimization. However, these are only down-the-line exemplary uses of the data provided to the database and the entire server architecture is a preferable but not necessary option of the herein described disclosure. These possible uses are, in other words, only application examples for the output of the herein proposed enhanced real-time image processing.

According to a first aspect, the present disclosure includes a method for counting the number of persons being (waiting, standing, moving etc.) at a predefined location, e.g. before entering a transportation vehicle. The method includes the steps of receiving images (frames, photographs) taken by one or more cameras mounted at the transportation vehicle; and tracking each detected person in all received images based on boundary boxes as well as counting the number of persons, preferably based on the boundary boxes.

Further, for each image, the following steps are performed for setting boundary boxes and for selecting boundary boxes: detect one or more persons in the received image, place a boundary box around each detected person, provide a window of interest in the image and apply a (predefined/optimized) filtering condition for selecting each boundary box in the window of interest when complying with the filtering condition.

It is noted that the term "predefined filtering condition" can also be replaced by "filtering condition" simply and both terms shall not exclude that the filtering condition is dynamically optimized (in real-time) during a learning phase of a respective machine learning/AI unit. Therefore, the term "predefined/optimized filtering condition" may also be used, alternatively. This also holds for other parameters which may be subject to optimization, especially during a learning phase. In other words, the "predefined" parameters may be optimized during a learning phase or an implementation phase of the herein described disclosure and they may be set as "predefined" after the optimized value or setting has been found.

The above steps can be performed in different hardware and/or software units of the respective apparatus and for each step a specific software or algorithm may be used. The steps of tracking detected persons, detecting persons and providing boundary boxes around a person in an image (frame) can be performed by previously known algorithms and software solutions.

With regard to the detection of a person, in general, the algorithm searches for a known and/or learned feature(s) of a human person and, when found in the image processed, reports a detection. The placement of a boundary box, which is additional data provided to the image, puts a frame, a rectangular box or the like around each detected person and adds an identifier to the boundary box so that the boundary box can be re-identified reliably and without additional computational burden after the first detection of the associated detected person.

With regard to the tracking of the detected persons, there are different approaches possible which may also be combined which have been summarized in the above by "based on the boundary boxes". In this point it is noted that the tracking of a detected person over different images requires ensuring that the same person is re-detected in other images after a first detection in an image. For this, a matching of the personal "features" of a detected person may be performed for each image, assuming that personal features are specifics of a person, such as body details, face details, parts of the body details, wherein the details may include, e.g., the shape of the body or parts of it, and other visible properties of a person.

Matching of personal features would now include that, when a person with a specific body shape (assuming body shape as an example for a personal feature, wherein other features may be used as discussed above) is once detected in an image, it is checked in other images whether the same body shape is detected in other images as well. In the present disclosure detection of a whole body is preferably applied so that not only single features of a person are detected (or searched for) but the entire body. If the same body or body features are detected in other images, the matching process/unit would output that the same detected person can be found in other images as well. The output may include the number or name or identifier of each image with the person detected, and based on said matching result, the same boundary box (with the same ID) may be provided around the detected person in each image where the person has been detected. In this regard, a confidence score may optionally be used which provides a likelihood for a correct detection/re-identification and it may be defined that the likelihood requires to be higher than a preset likelihood threshold, such as 80%, 90%, 95%, 99% or the like.

Another option for re-identification and tracking of detected persons may include that the position of the boundary box or the position of the detected person one image is used to find the same person in other images. Here position can either mean the position within the reference system of the image or a position within a global coordinate system (geographic coordinate system). This option further may rely on a certain predefined degree of allowed movement of the detected person and its boundary box which may be predefined to be within half a meter, some centimeters or a meter or the like (translating into a respective number of pixels or the like within the images). The algorithm for matching may then decide to re-identify a detected person in a different image if the position of the boundary box in two or more images is the same or within the above discussed boundaries approximately the same. The assumption behind this is that, passengers waiting for a train or the like, normally stand rather still when the train enters the platform. Concretely, it is noted that the relative speed of the vehicle is much larger than the one of the people. Hence, people's movement, if any, can still be considered small. Further, preferably, in the tracking algorithm, the bounding boxes' positions are projected based on the linear speed assumption, so that the candidate for association steps can be found. This option works even more reliable and accurate when combined with the above discussed matching by comparing personal features of detected persons.

Based on the matching, detected persons can be tracked over the plurality of images so that a once detected person is reliably re-detected in all other images. The matching can be performed before the tracking or vice versa and both steps rely on image processing, preferably in real-time within the respective control apparatus which is onboard the transportation vehicle. As noted above, the detection and matching/tracking of persons by image processing is known in the field and no further discussion is needed here. Optimally, said image processing is performed by a computer with respective software programs run thereon. The use of respectively trained artificial intelligence unit(s) or machine learning unit(s) is preferred for these tasks because may be they are particularly strong when it comes to image processing and image comparison processes. Training performed with example images as an input.

It is furthermore noted that the number of images taken, which depends on the frequency and/or the speed of the transportation vehicle, may also be considered as a video or the camera(s) may indeed take a video and then frames of the video are processed in the same way as described above and below in regard of single images/photographs.

When all images of one predefined location (including the approach thereto) have been processed, the number of people being there before they have entered/enter can be counted, e.g., simply by counting the number of different boundary box IDs (which may be simply the sum of the unique IDs) and/or by counting each person based on the personal features detected.

The above measures already increase the reliability and accuracy because the prevention of a mis-re-identification is improved and occlusion is reduced/avoided by the taking of many images during the approach of the transportation vehicle to the predefined location which results in different viewing angles on the surroundings, e.g. the station.

Even further, the technical effect is increased by introducing the window of interest and using the at least one filtering condition during the above explained steps of the image processing. Even further, the "tuning" (optimization) of parameters, such as the filtering condition or parameters relating to the window of interest or the like, even further increases the accuracy and reliability of the herein proposed technical teaching.

Specifically, the window of interest includes additional data associated with each image/frame and it may be described as a sub-area/sub-section of an image. Said window of interest is introduced for each image after the people detection step, preferably. However, it may also be introduced before the people detection step, i.e. as a first step. The processing of each image as described in this disclosure makes use of the window of interest in order to reduce the area of an image to be processed in view of people detection, placing of boundary boxes, and/or matching and tracking of detected people. In other words, these steps or some of them are only performed within the sub-section of an image which is defined by the window of interest.

The technical benefit thereof is that the inventors of the present disclosure have found out that the image processing reliability and accuracy can be increased by using the window of interest, e.g. due to the fact that the window of interest, especially when optimally positioned and shaped, can ensure that only parts of an image are processed where personal features and the like are identifiable and recognizable in a good manner. For example, the window of interest is preferably set such that only the surroundings of the camera which has taken the image are image processed which are quite close to the camera or where the angle is optimal for the image processing. This, e.g., can avoid that the image processing in view of detection or tracking is performed on details of the image which are hardly visible, e.g. due to a large distance from the camera. The features of hardly visible people are possibly inaccurate and the detection and tracking may become inaccurate. This is avoided by the teaching of the present disclosure.

Even further, increasing the accuracy even more, preferably a filter(ing) condition is used based on which the selection of boundary boxes (or detected persons) is performed. In other words, the optional use of the filtering condition can help to avoid that boundary boxes or detected persons are processed in an image even though they overlap in the image only partly with the window of interest. In even other words, if a boundary box would be processed for a specific image which only overlaps with the subsection of the window of interest to a certain degree, e.g. less than 50%, less than 80%, less than 90% or the like, the tracking accuracy and reliability could be reduced due to the reduced overlap. This is avoided when only boundary boxes or detected persons are selected for the tracking when the filtering condition is fulfilled for them in view of a specific image and its window of interest.

With the above configuration and steps, the image processing is enhanced significantly as discussed before.

Further, as a preferable option, the predefined location of a public transportation system is defined by coordinates, especially geographic coordinates. Further, the camera(s) of the transportation vehicle takes images (or videos) during the approaching of the transportation vehicle to the predefined location. The capturing of images is started preferably within a predefined distance from the predefined location, i.e. as soon as the transportation vehicle has come as close as the predefined distance to the predefined location, the image-taking process is initiated, e.g. by the control unit. The process of taking images may preferably be continuously performed until the transportation vehicle stops moving at the predefined location. Alternatively, if the process of taking images shall not be stopped when the vehicle stops moving, the process of taking images may also be stopped when the vehicles passes or arrives at a specific location, when the vehicle arrives at predefined coordinates or when the vehicle leaves the predefined location after it stopped there, or the like.

The start and the end of the image taking may be started automatically based on the respective locations of the transportation vehicle.

Further, the window of interest may be placed in each received image in a way that it includes a section/area of the surroundings of the predefined location within a predefined range from the camera of the transportation vehicle. In other words, the window of interest may be placed in each image so that a specific area of the photographed location is covered by the window of interest.

As already discussed above, the technical benefits of the above features can be summarized that mis-re-identification is reduced/avoided and that occlusion effects and other factors which could reduce the image processing result can be avoided, too.

Preferably, the predefined location is a station of the public transportation system.

According to a further preferred option, the filtering condition is determined as the ratio of an area of a boundary box which intersects with the window of interest and the (total) area of the window of interest (i.e. intersection over union condition). In other words, the overlapping area and the total area are compared to each other and the resulting ratio value may be compared to a threshold value, which may also be an optimized value. The filtering condition is predefined to be met if the ratio value is equal or larger than a predefined minimum (intersection) value, i.e. threshold. The threshold may be a value, such as 70% or 0.7, 80% or 0.8, 90% or 0.9, 95% or 0.95 etc. Preferably, the threshold is at least 70% for a high accuracy.

According to a further preferred option, for each boundary box of a detected person, a unique ID (identifier) is assigned and the counting of persons is performed by counting the number of unique IDs present in the received images. This option reduces the computational burden of counting the detected persons and thus synergistically adds to an enhanced image processing with as low as possible computational costs.

According to a further preferred option, the window of interest in regard of its size and its position within each received image is adapted for each image based on window of interest parameters which are provided by a trained machine learning unit and/or artificial intelligence unit.

The window of interest parameters may specifically include the dimensions of the window of interest, preferably relatively defined in view of the size of the image, the shape and the position of the window of interest within the image. The position may be defined by a preset definition point or pixel from which the window of interest may be constructed based on the further parameters, such as shape and dimensions of the window of interest.

In regard of the setting of the window of interest parameters there are different, also combinable, preferred options. For example, the herein described method and later described apparatus and system may rely on a previously trained machine learning/artificial intelligence (unit, machine, device, software and/or hardware) which provides the parameters based on its previous training during the actual use of the present method/apparatus/system. Further, in another example, parameter values may be preset and pre-stored in a database or the like and then no artificial intelligence or machine learning is required. The pre-setting can be performed, e.g., by a human during the pre-use preparation of the apparatus/system by using images or knowledge available about each predefined location. E.g., the person setting the parameters may know the predefined locations or may use images thereof, to define the parameters for each of it. Even further, the above examples/options may be combined, e.g., by setting initial parameters before the first employment "by hand" and by training the machine learning (ML) unit or the artificial intelligence (AI) during the first employments of the transportation vehicle by using real-time images as training data so that the initial parameters may be refined/improved over the course of time during the use of the herein described apparatus/computer program product and the like.

Relying on an adaption of the window of interest parameters enables further improving the accuracy and reliability of the herein described image processing because real and real-time data can be used for the training of a ML/AI and they can provide specifically adapted parameter settings. Further, the adaption option also helps to adapt to changes, such as caused by construction sites, new stations of a transportation vehicle line, etc.

According to a further preferred option, the predefined filtering condition is adapted, preferably in a processing loop of the received images, based on filtering condition parameters received from a trained machine learning unit and/or artificial intelligence unit. The same as described in view of the window of interest parameters holds correspondingly for the filtering condition and its parameters. In other words, the filtering condition may be set in advance, may be set by ML/AI unit(s) and/or may be set based on a combination of using an initial value which is refined/optimized by a live training of the ML/AI and its output. The above mentioned preferably processing loop in particular relates to (which also applies to the window of interest parameters) the use case where the ML/AI is (further/additionally) trained during the live use/employment with real-time, live images. Such a loop may, e.g., be added to the before described image processing steps so that even during the real use of the herein described disclosure optimization may be performed. Even further, it may also be predefined that, after a curtained pre-settable number of optimization processing loops/training rounds of the ML/AI, the optimization and adaption of the filter condition and window of interest parameters is stopped, e.g., when a satisfactory result in view of reliability and accuracy is achieved.

A preferably filtering condition parameter includes the threshold for the ratio value in regard of the overlap of the boundary box and the window of interest.

According to a further preferred option, for identifying a person uniquely and for tracking each respective/associated boundary box over all received images, predefined personal features of detected persons are extracted and compared to each other in a matching process. The matching process has been described above and it supports to increase the reliability with regard to re-detection, i.e. avoiding of mis-re-identifications.

According to a further preferred option, the steps of placing a window of interest and applying a predefined filtering condition to each of the images, the tracking of each boundary box of each detected person and an optimization of the parameters of the window of interest and parameters of the filtering condition are repeated in a processing loop. With the looped processing, even during a real-time scenario the accuracy of the image processing may be improved, especially in the example case that the ML/AI unit is used and not fully trained when employed first. Therefore, the looped processing may also be set to be used only during an initial predefined period of time when the herein described is used in a real "productive" scenario for the first time, e.g. the period may be set to be some days, some weeks, some months or the like. This further increases the accuracy and reliability of the image processing and it is further noted that during the training of the ML/AI unit(s) it is preferred that human trainer supervises the output/results of the image processing for improving the training of the ML/AI unit(s).

Further, an aspect includes a control apparatus (or apparatus) comprising input and output units, which may be combined to one or may include more than one, for receiving images taken or videos from one or more cameras mounted at a transportation vehicle, a person detection unit configured to detect persons in an image (frame) and to provide a boundary box around each detected person in the image, a window of interest setting unit configured to set a window of interest in a received image, a filtering unit configured to apply a filtering condition for determining which of the boundary boxes are selected within the window of interest, a tracking unit configured to track (and match) boundary boxes of the detected persons (or detected persons), and a counting unit which is configured to count the number of the detected people within the window of interest in each received image.

With regard to the matching performed by the tracking unit or a separate unit it is noted, as discussed above, that an extracting and compare of person features of detected persons is one preferred option for re-identifying and then tracking detected persons over different images. However, as also described in connection with the method above, other options may also be used, such as boundary box position matching where the extracting and comparing of person features may not be necessary.

In general, it is further noted that the apparatus may perform the above method steps and may be configured accordingly resulting in the same technical benefits and effects so that a redundant description thereof is avoided here. Units (which may also be named device, module, entity or the like may be configured by software and/or hardware and they may be part of a single computer or dedicated hardware units). The same holds for the below described computer program product and the system.

Further, an aspect includes a computer program product configured to carry out the method of at least one of the above method features when executed by a computer.

A further aspect includes a system including the control apparatus as described above, a localization unit mounted at or on a transportation vehicle, one or more cameras mounted at or on a transportation vehicle, and optionally a remote computer which is connected to the control apparatus via a wireless data connection.

As explained before, enhanced image processing for the specific application in especially public transportation is presented with this disclosure.

Figure 1:
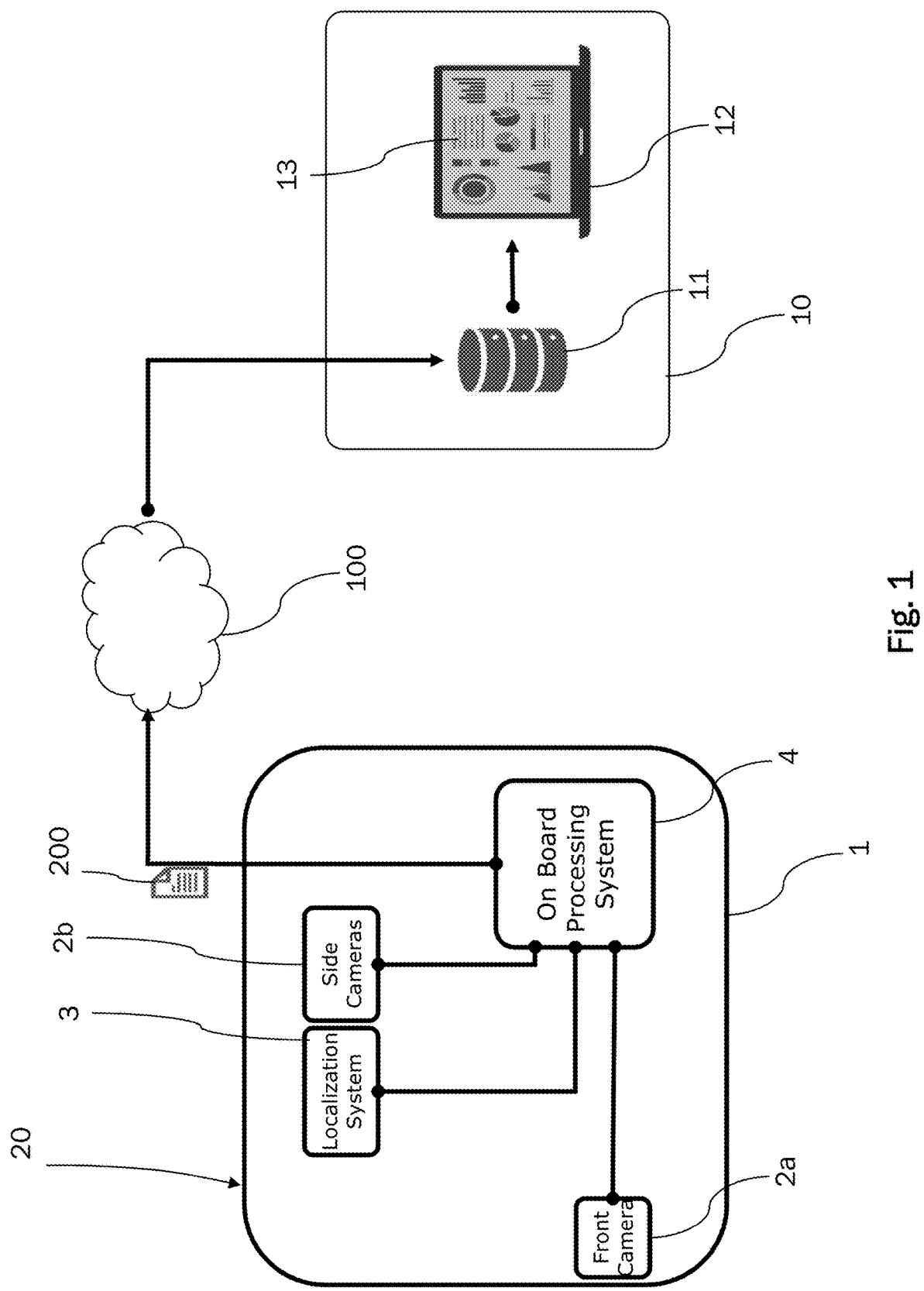
FIG. 1: shows an example of the system according to the present disclosure.

In the following, preferred aspects and examples will be described in more detail with reference to the accompanying figures. Same or similar features in different drawings and examples are referred to by similar reference numerals. It is to be understood that the detailed description below relating to various preferred aspects and preferred examples are not to be meant as limiting the scope of the present disclosure.

FIG. 1 shows, on the left-hand side, a system 20 including a transportation vehicle 1 schematically indicated by a box having mounted thereon, one or more front cameras 2a, one or more side cameras 2b and a localization unit 3, such as a global positioning system (GPS or Galileo or the like) sensor, which feed data, such as position data and image data to an onboard processing system which may also be called a control apparatus 4 in the following.

The control apparatus 4 may send in a wireless manner, e.g. via the internet 100 or the like, data 200 to a remote computer (server) 10 which may at least include a database 11 and computing unit(s) 12 as well as computer programs (not depicted) stored in a storage space (not depicted) for providing web-based applications 13, e.g. such as dashboard functionality, graphical user interfaces or the like.

The data processing, the position processing, and the passenger flow processing (i.e. the counting of persons at predefined locations, in particular) are preferably carried out on board of the transportation vehicle (briefly: vehicle) and specifically preferably in the control apparatus 4, which may include specific sub-units which are not depicted for said purpose. Further, the onboard system/control apparatus 4 may be connected by wire or wireless to a set of sensors for data, position, and computing units for processing and temporal storage. The sensors may for example include the above discussed cameras 2a, 2b and localization sensors 3, such monocular cameras or any other type of cameras for acquiring/capturing images of the surroundings of the vehicle and the localization system/position sensor provides actual position coordinates of the vehicle of a time.

The control apparatus 4 may receive data via input/output units (hardware and/or software) of the control apparatus 4 which are not depicted except some bold dots at the frame of the depicted control apparatus schematic in FIG. 1. These input/output units can be arranged as it is known in the art. The position coordinates can be determined by a global navigation satellite system (GNSS) such as Galileo and/or GPS in combination, preferably, with inertial sensors or odometry data provided by the internal system of the vehicle 1 and/or vision-based motion estimation systems. The cameras 2a, 2b are preferably calibrated intrinsically and extrinsically so that the mutual position of each camera 2a, 2b with respect to each other camera 2a, 2b and to the vehicle reference frame is known in advance. Therefore, objects to be detected, preferably persons/people, can be reliably and accurately localized in the space/surroundings/surrounding environment around the vehicle 1. Furthermore, the storage unit (not shown) of the control apparatus 4 may store an annotated map which includes predefined (key) locations where the passenger flow data 200 shall be acquired. In other words, the predefined locations are locations preset in the map where the counting of persons shall be performed by the herein presented disclosure.

Accordingly, when the control apparatus 4 is operating, the position of the vehicle 1, provided by the localization unit 3, is compared to the predefined locations stored in the annotated map. If the vehicle 1 is about to enter or approach such a predefined location within a certain distance, the herein described passenger/person counting is triggered. That means, it is started automatically. The resulting data 200, which also may be named "passenger flow data", may include vehicle location, passenger data, including the number of passengers in the area, the number of passengers at the station and/or platform, the number of passengers getting on the vehicle, the number of passengers getting off the vehicle, etc., and/or the acquisition time of these data. The passenger flow data 200 is temporarily stored in a local database of the control apparatus 4 and may be sent to a remote server 10 including another database 11.

As noted above and being an optional alternative, after having performed the processing of passenger flow data, the locally stored data 200 may be sent, via a wireless connection, to a remote server/computer 10. Therefore, the loss of data can be reliably prevented and only if the connection to the server 10 and the transmission process being completed correctly, the passenger data is flagged as transmitted and if it can be deleted in the local database of the control apparatus 4 after it has been securely stored to the remote computer/server 10.

The server 10 (e.g., a cloud-based data storage and analysis system) may convey the passenger data from each vehicle 1 in a transportation network. The passenger data may be stored in the database 11 and may be updated online, as it has been described above in connection with one vehicle. Thus, it is enabled that a user of a web-based application 13, for example, can access the passenger data of the entire transportation network. The presentation may be done by means of a dashboard with/or a graphical user interface or the like. The dashboard may for example visualize the current situation of the network via online updates of the passenger data 200 as well as historical data. Based on the analysis data, users may perform data-driven optimization tasks such as city planning, time table optimization, traffic light synchronization, energy usage optimization etc. It is noted that the above described use cases are all example applications which are enabled by the underlying improved image processing of the image processing method and control apparatus as described in the following in detail.

Figure 2:
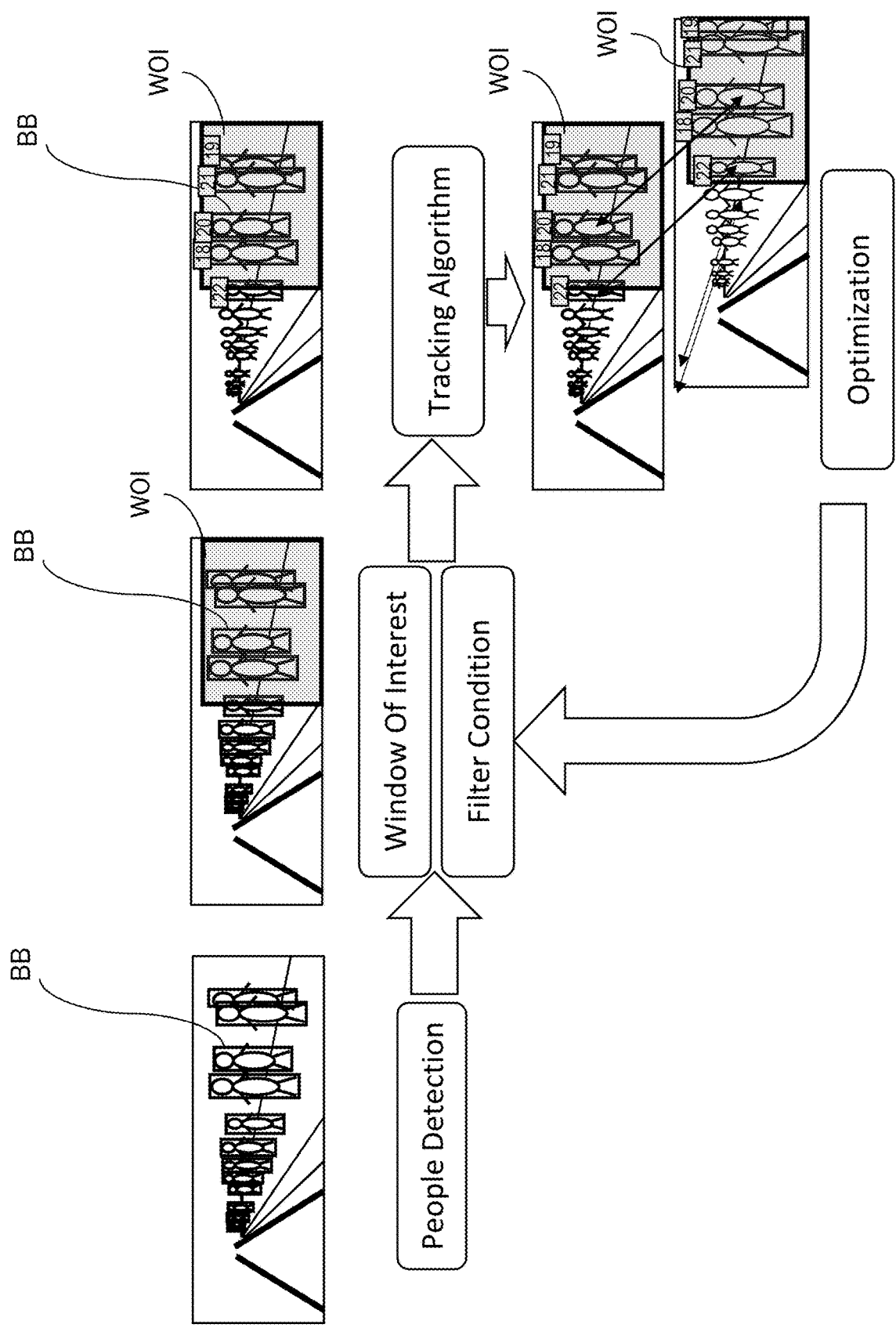
FIG. 2 shows an overview over steps of the method described by the present disclosure.

FIG. 2 shows an overview over steps of the method for identifying and counting people/persons at a predefined location, which is preferably a station of the transportation system of the transportation vehicle 1.

At the beginning of the processing, photographs/images or videos, which have been taken by the cameras 2a, 2b of the vehicle 1 while approaching a predefined location, are processed based on known-in-the-art detection algorithms/programs for the detection of persons in an image, as it is shown in an example on the very left side of FIG. 2 (labelled by "people detection"). Concretely, the step labelled with "people detection" shows on image/frame which is processed.

The result of the detection processing is that for each detected person, a boundary box BB is provided around each detected person in the image. For a better readability, only one boundary box is indicated by "BB" in the images. However, as one can see, many boundary boxes are placed because many persons are detected, wherein, e.g., in the comparison of FIGS. 4A and 4B it is immediately clear that the number of boundary boxes is reduced due to the window of interest placement. Data relating to the boundary box position and the like may be stored in a different file than the image file itself or in another layer of the image file so that a data/file structure can be stored in the storage space of the control apparatus 4 which allows fast and low-computational burden further processing. Optionally, a confidence score value for judging the confidence of the person detection can be provided.

In other words, when the vehicle 2 is approaching a station or a generic location of interest (predefined location), the data stream of images taken by the onboard cameras 2a, 2b of the vehicle 2 which are pointing at a platform of a station or the like and at the people standing there, is sent to the control apparatus 4. Depending on the pre-definable frame rate of taking images this image data stream may be an equivalent to a video, as described above. It is noted that the frame rate may also be optimized for improvement because based on the processing rate (frames per second) an assumed linear speed of the detected and tracked people in the scene, i.e. at the location, may be determined/assumed.

As mentioned before, a known in the art detection algorithm is preferably applied for the processing of each image received by the control apparatus 4 in order to detect people and in order to provide boundary boxes drawn over each person across every image received at the control apparatus 4.

Afterwards, in the herein disclosed method, computer program product and so on, as indicated by the image of the upper/middle part of FIG. 2, a window of interest WOI is added to each image. This is shown in FIG. 2 by a black frame put around a sub-section/sub-area of the image. In FIG. 2, in the middle image, the lower right corner of the image is defined to be included in the window of interest. Further, a filtering condition is applied for each image so that detected persons in each image can be filtered out based on whether they are within the window of interest or not. If a detected person partially intersects (or the area of the associated boundary box) with the area of the window of interest, they can be de-selected for the further processing in connection with said image, by applying the filtering condition for determining whether they shall be selected or not for the further processing in the processing of said very image.

Especially, this step of setting a window of interest and applying a filtering condition has technical benefits for achieving an improved image processing: providing the window of interest at a specific subarea of the image can help to avoid that persons are selected from the images which are hardly visible or very small in the images, for example due to occlusion or due to a large distance to the camera. For example, therefore, placing the window of interest in a range being within a predefined range which is close to the camera can avoid that far distant passengers which are hard to identify are selected from said image for a further processing, such as the tracking. Therefore, preferred locations for placing the window of interest in an image are for example at the lower corners of an image depending on whether the station platform is located to the left or right of the vehicle. Furthermore, selecting from an image only clearly identifiable persons can avoid that a same person is re-identified erroneously from another image (usually a subsequent frame) as a different person. Even further, the filtering condition further increases accuracy and reliability, because, if the filtering condition uses, as exemplified by FIG. 4C, an intersection over union or Jacquard index, only those persons detected from an image or boundary boxes in an image are selected which are sufficiently located within the window of interest to be reliably processed by the following steps of tracking persons.

Figure 3:
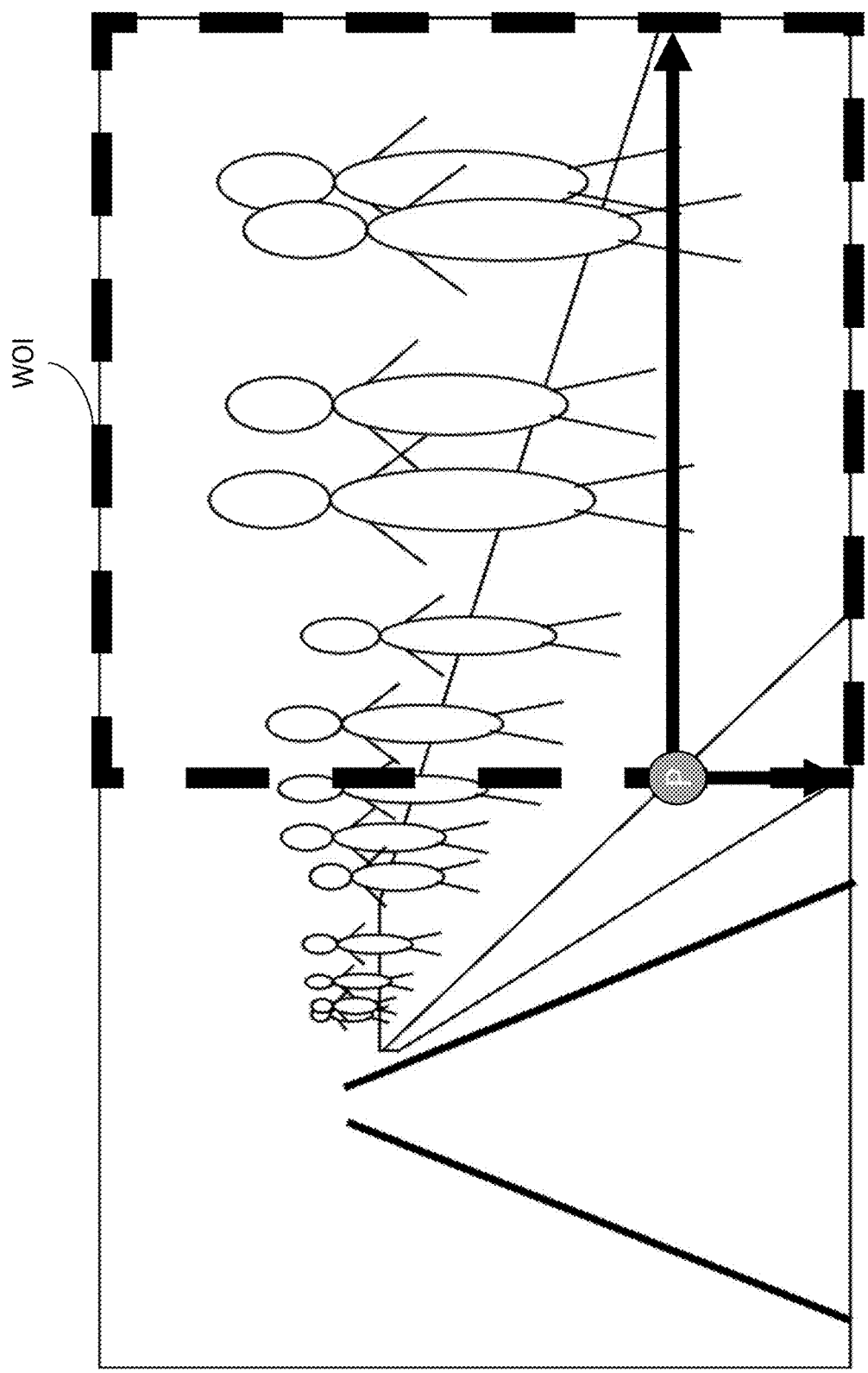
FIG. 3 shows an example for providing a window of interest in a single received/captured image.
Figure 4A:
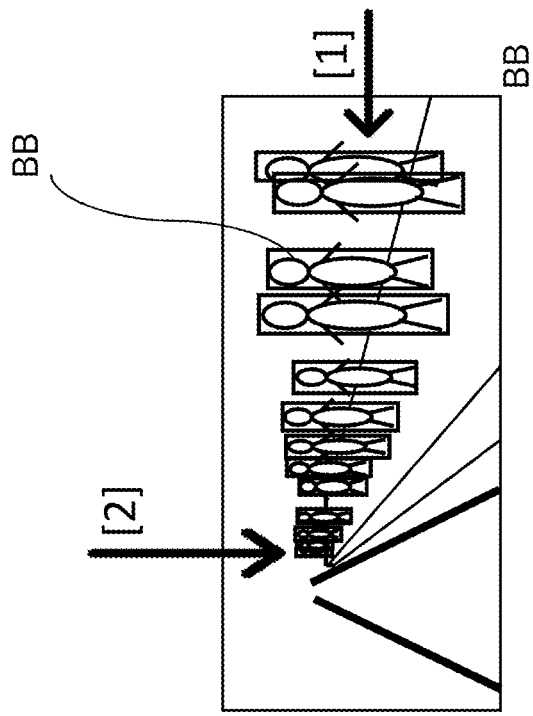
FIG. 4A shows an image of a station after the person detection has been performed and boundary boxes have been added.
Figure 4B:
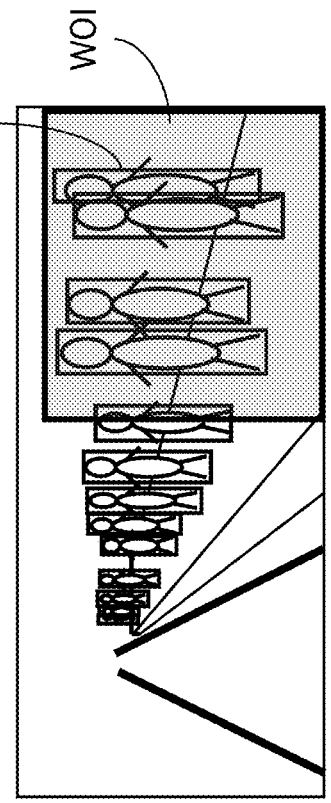
FIG. 4B shows the selection of boundary boxes based on providing a window of interest.
Figure 4C:
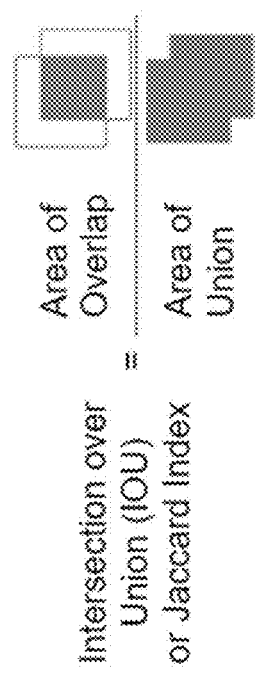
FIG. 4C shows an explanation of as to how an intersection over union parameter can be determined.
Figure 7:
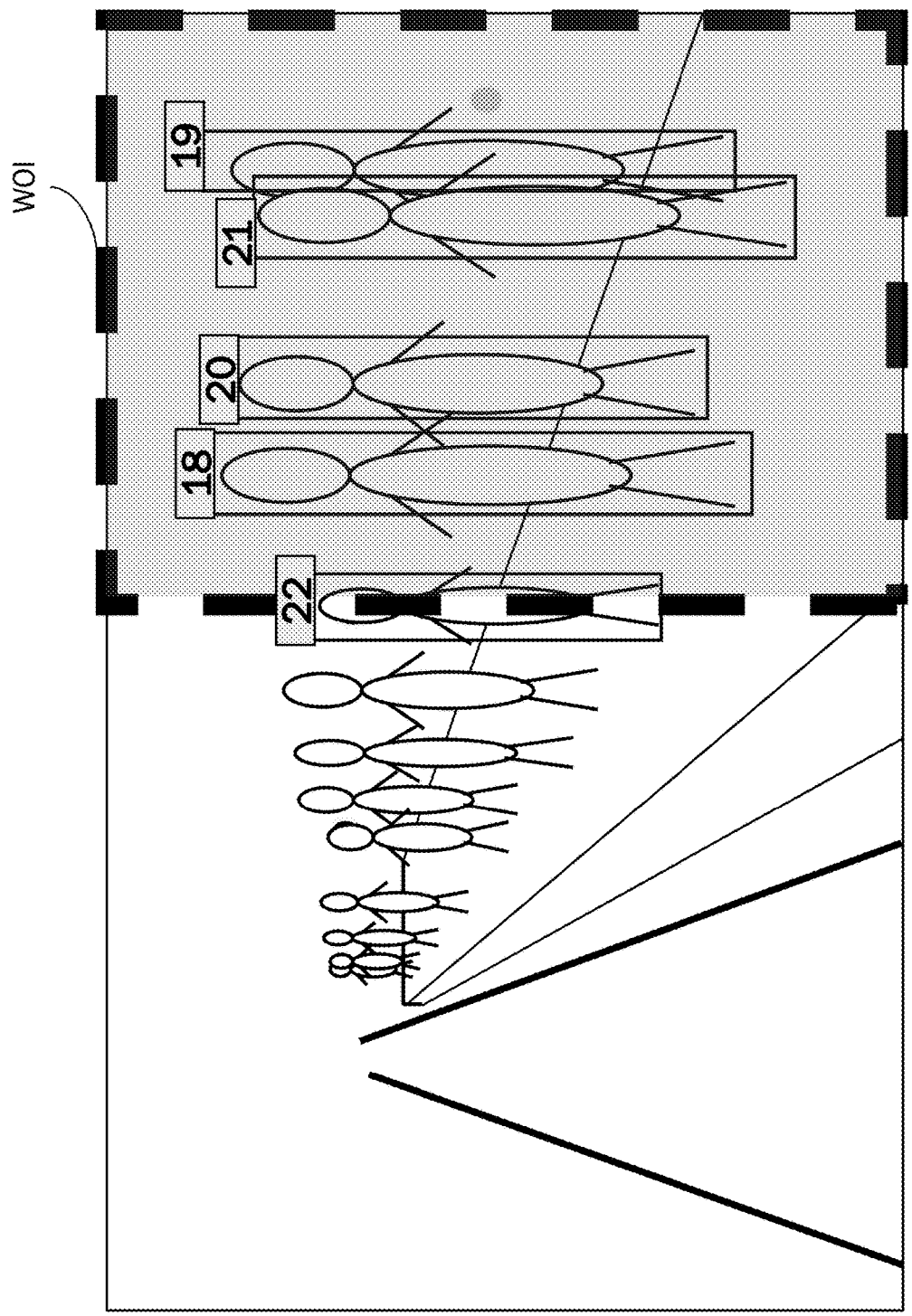
FIG. 7 shows another example for providing a window of interest in a single received/captured image.

A further example for the placement of a window of interest is shown in the enlarged image of FIG. 3 in which a bold broken line on the right-hand side of the image indicates the edges of the window of interest in this example. Furthermore, FIG. 4A shows an example that, at the position indicated by the arrow [1], where persons are relatively close to the camera, persons are well recognizable/detectable and, therefore, selectable for the further processing in connection with said image. Further, FIG. 4A shows another example for the situation that persons/people are standing far away at the platform of the station, such as indicated by arrow [2], in which the detection reliability is known to be low and, therefore, should be avoided. As a result, as one example, the window of interest WOI in FIG. 4A is located at a lower right corner covering only a closer part (closer to the camera which has taken the image) of the station/image area which is depicted by FIG. 4B with the black bold rectangle indicated the window of interest of the image. FIG. 7 shows a similar example as FIG. 3, however, in FIG. 7 it can be understood, e.g., that the boundary boxes having ID's 18, 19, 20, and 21 are selected based on the window of interest setting while the ID 22 is not selected since it does not share sufficient area with the window of interest. This will also be understandable from the further description of FIG. 2 in the following.

In other words, effectively limiting the vision field of a camera 2a, 2b without exposing it to the people standing at the end of a platform, for example, before the vehicle 1 has moved closer to the end of the platform, the herein proposed method can reliably identify persons because the images are taken by the cameras 2a, 2b of the moving vehicle 1 from a starting point of the image taking process until the vehicle 1 comes to stop at the station. The resulting time series of images can then be processed by applying the above described window of interest and filtering condition and combined with people detection and tracking over the time series of images to reliably avoid mis-re-identification of already detected persons. This also avoids occlusion due to the moving camera perspectives in the time series of images.

Preferably, each detected person or the associated boundary box is assigned with a unique ID (e.g. as explained in connection with FIG. 7 above), so that a further identification of the same person is excluded when the same person is visible in other images of other cameras or in images subsequent in time in the time series of images. This can be further enhanced by a matching step, e.g. before, while or after the tracking step is performed, which can be applied to detect person features and which can be matched to person features in other images to re-identify persons over different images. The matching furthermore can also include comparing the position of a detected person or the boundary box over different images to match detected persons/boundary boxes with each other.

In other words, for example, the above described application of filtering condition(s) which includes preferably comparing the ratio of a boundary box area within the window of interest area to a predefined threshold ratio value (for example if the ratio is larger than 10, 20, 50, 80% or the like, it is decided that the respective boundary box with the associated detected person therein is included/selected for the respective window of interest) enables that unwanted boundary boxes are filtered out, especially those of people which are hard to identify in a certain image (for example, people standing at the end of the platform or being occluded in a specific image). Since mis-re-identification can be reliably excluded, detected objects/persons can be tracked with minimal error over the different images in the time series and it has been found that the solution works robustly even within different weather conditions, such as night, day, rain or snow.

The description now returns to FIG. 2: After placing a window of interest and applying the filtering condition, a tracking algorithm/program known in the art is used for tracking the detected persons over different images. In order to do so, unique identifiers (IDs) are provided for each boundary box of a detected person in each image (see FIGS. 2 and 7 for an example of IDs). The counting of the number of persons at the predefined location can be carried out, then, simply by counting the unique identifiers present in the set of images, wherein one set of images or videos is assigned to one approach/predefined location. The tracking of the detected persons over different images is only performed for the selected persons/boundary boxes within the window of interest for the reasons described above, i.e. ensuring that from each image only well-detectable and identifiably parts are used for increasing accuracy and reliability of the tracking and counting of detected persons.

Further, as an optional improvement to the above described steps, FIG. 2 shows an optimization loop which can be introduced and which enables the modification/adaption of certain parameters, including the number of detected people which should be processed during one processing loop, the number of images being processed during one processing loop, etc. Even further, the parameters related to the window of interest and to the filtering condition may be optimized by this further optimization step shown in the lower part of FIG. 4.

With regard to the parameters relating to the window of interest, these parameters may include the shape of the window of interest, the position within an image which may also be dependent on each different predefined location, the area size of a window of interest, etc. With regard to the filtering condition, for example, the threshold value for the ratio value described above may be an object of optimization. This process will be further described in connection with FIG. 6 below.

Figure 5:
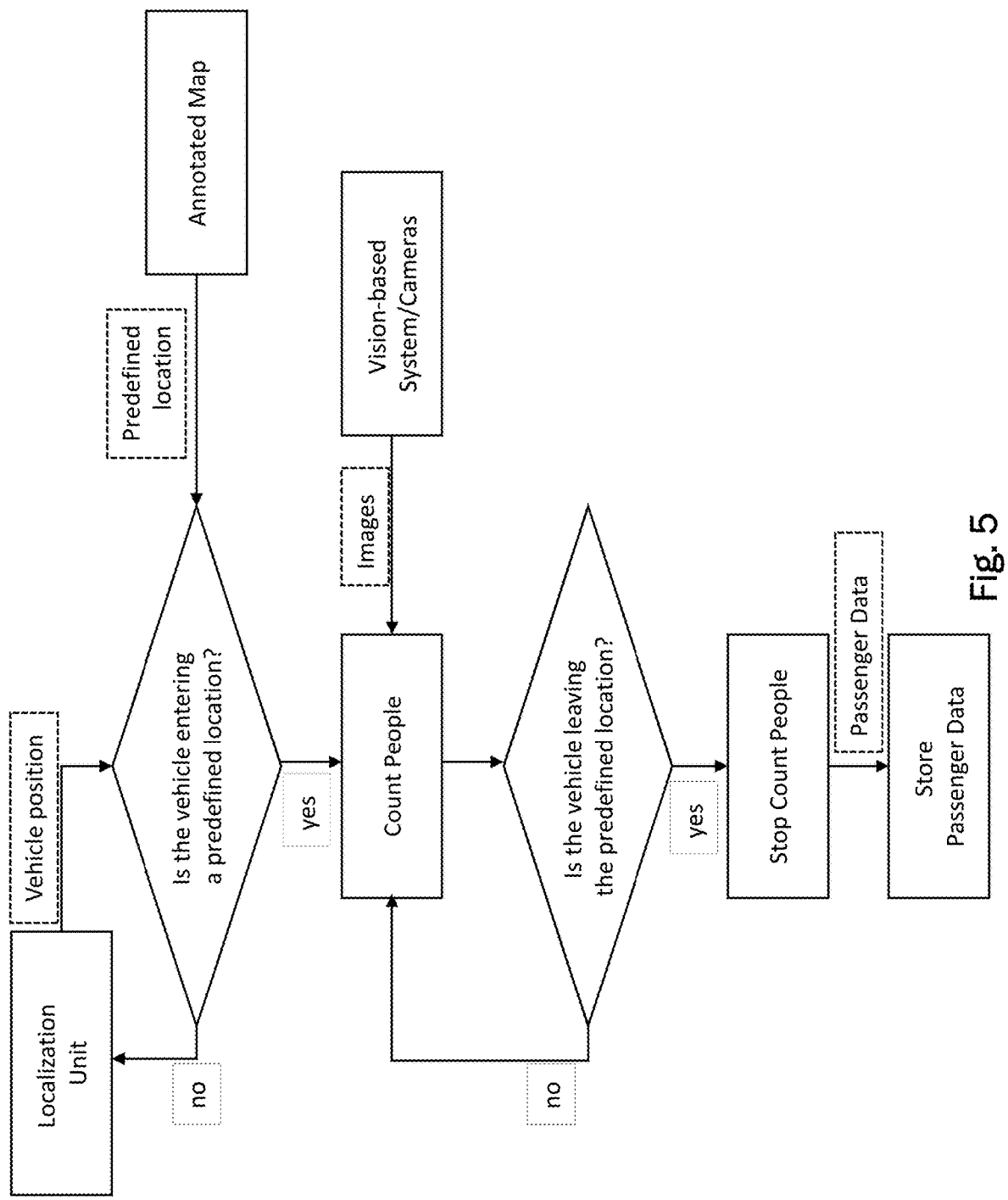
FIG. 5 shows steps of a workflow of a method for identifying/counting persons/people at a predefined location.

FIG. 5 shows a global workflow during which the method as described in connection with FIG. 2 may be applied. It shows that a localization unit/system 3 provides the vehicle position (data) to the control apparatus 4 and that a decision is taken whether the vehicle 1 enters a key/predefined location. This checking may be periodically performed, such as every second, every plurality of seconds, or even every minute(s). The decision is taken based on information received from an annotated map which indicates the coordinates of predefined locations. If the vehicle position coordinates and predefined location coordinates, which may be sets of coordinates for a plurality of different predefined locations, received from the annotated map match with each other, the answer is "yes". Otherwise, the answer of the checking is "no". It is noted that "match" in this context preferably means that the vehicle 1 is close to, i.e. its position is within a predefined distance, to the predefined location, when the decision/matching in FIG. 5 returns "yes" so that the processing of taking photos can start before the stopping of the vehicle 1 at the very predefined location and so that the images can also be taken while approaching the predefined location. If the answer is "no", the sub-process loops further. If the answer is "yes", the counting of people process is started which has been described in connection with FIG. 4. The input for the processing, as also described before, includes images/videos which have been taken by camera(s) 2a, 2b of the vehicle 1 during the approaching of the predefined location and until the vehicle has stopped at the predefined location. It is alternatively possible that another criterion for the stopping to take images may be used instead of that the vehicle 1 stops. For example, a location or location coordinates may be defined at which the image taking is stopped without the vehicle 1 necessarily stopping or having stopped. Then, as long as the vehicle is in the process of approaching the predefined location and standing at the predefined location, the counting of people by processing the captured and received images is performed. It is noted that the processing of capturing further images may already stop when the vehicle 1 has come to a stop at the predefined location. However, alternatively, the taking of further images may also continue during the stop and until the vehicle 1 starts moving again. The latter option being shown by FIG. 5 where the second decision indicates that the stopping of counting people is started when the decision returns "yes" in reply to the question whether the vehicle 1 is leaving the predefined location. The related passenger data 200 is then stored in the control apparatus 4 locally and may be subsequently transmitted to the remote computer 10.

Figure 6:
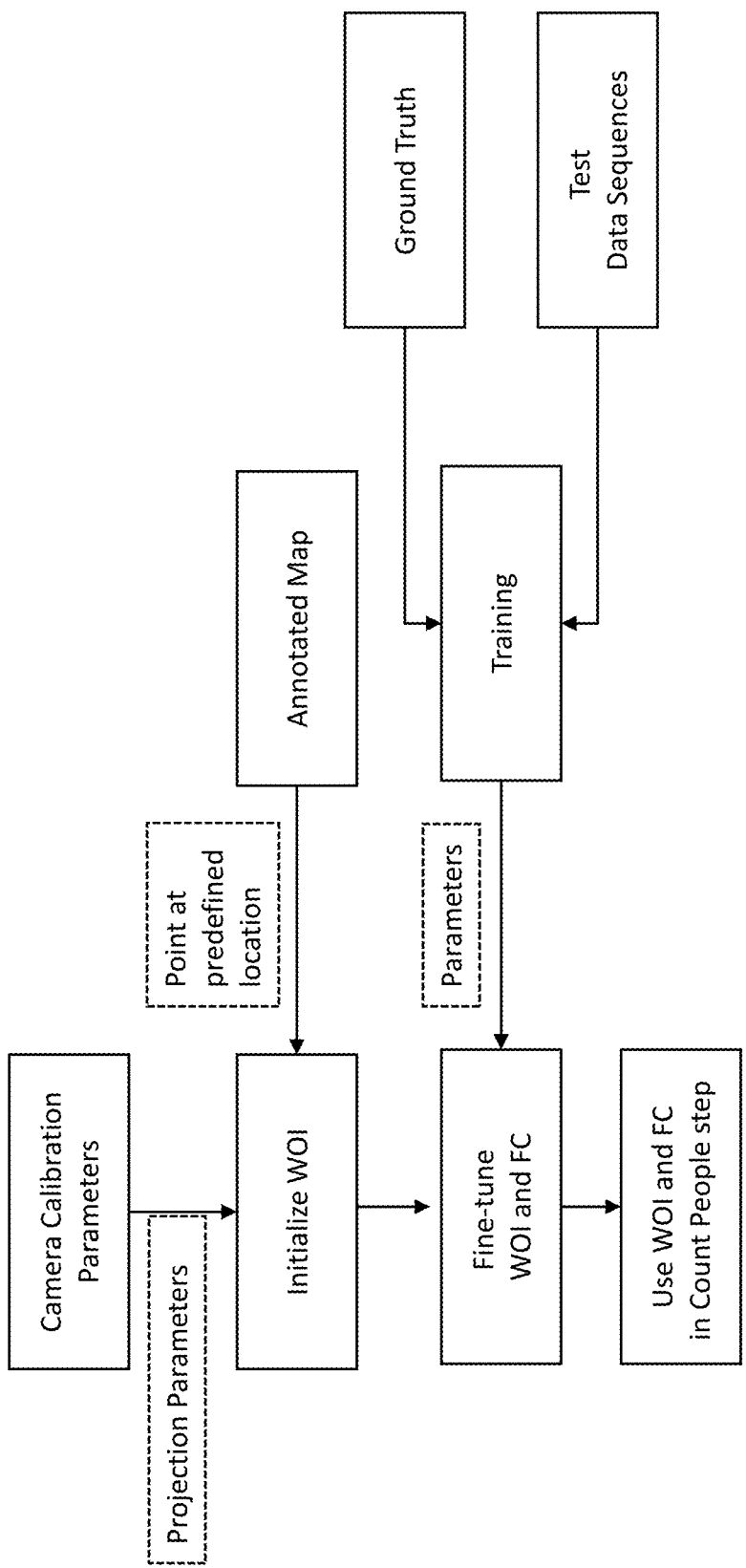
FIG. 6 shows a flow chart related to the placing of a window of interest in an image and the optimization of filtering condition parameters and window of interest parameters according to the present disclosure.

Now turning to FIG. 6 which shows an example of generating the parameters for setting the window of interest (WOI) and a filtering condition (FC) as well as fine tuning/optimizing them. The flow of steps as shown by FIG. 6 may either be performed before the control apparatus 4 is used/employed to its intended use, i.e. during a training phase, or it may be used during a real employment, especially at the beginning thereof in order to fully train the AI/ML units. As shown by the flow chart of FIG. 6, camera calibration parameters, such as mounting position, relative positions, optical parameters, etc. are input as projection parameters for initializing the placement of a window of interest at a predefined location which coordinates are provided by an annotated map. In other words, the window of interest is initialized by exploiting the geometry of the surrounding environment/scene. As the camera is extrinsically calibrated, the window of interest can be automatically drawn from the geometrical shapes of the environment, e.g. the known position of a platform or station. FIG. 3 shows, as indicated by point "P", as to how the initializing of setting the window of interest may be performed. Specifically, the coordinates of the predefined location received from the annotated map indicate the geographic coordinates of the predefined location which may be marked in the image(s) by "P". With the information about the position of "P" in the image, the window of interest may be generated, e.g. based on further parameter indicating the width and/or height of the window of interest as well as the shape thereof. In FIG. 3, with the rectangular shape of the window of interest, e.g., the x- and y-coordinates of the position of P within the image define the window of interest.

Further, in optional steps, a fine tuning of the filtering condition parameters and the window of interest parameters can be provided by ML or AI units. The optimization loop is shown in the lower part of FIG. 2 and increasingly more accurately trained ML/AI units can provide ever more fine-tuned/optimized parameters for the window of interest and the filtering condition, especially in the application scenario where the training of the AI/ML units have not been finished before the first real-world employment of the control apparatus 4/system 20 and or when changes require a new training, such as construction sites, new predefined locations, alternations of predefined locations and so on.

FIG. 6 shows that the ML/AI unit(s) are trained based on ground truth data and test data sequences, wherein the ground truth data may include data about, e.g., actually counted people (by humans) during different scenarios which are compared to results output by the control apparatus 4 for the same scenarios and test data sequences may include (especially prepared) images with known conditions and a known number of persons. Based on the training, the ML unit/AI unit may be provide parameters for setting the filtering condition and window of interest parameters wherein with every training step/repetition the parameters become more accurate until a final training state is reached. The parameters may then be used for the setting of the window of interest and the filtering condition.

FIG. 2, lower part, shows further a result of the optimization by showing an image two times and it can be seen from the IDs in the two different images (18, 19, 20, 21 and 22 in the one and 18, 19, 20 and 21 in the other) that a different configuration of the window of interest leads to different boundary boxes being selected, which is also indicated and for better comparison by two double-sided arrows showing the different relative positions of the boundary boxes with ID 20 and 22 depending on the configuration of the window of interest WOI. It is noted, that the IDs being used in the present Figures are merely examples and the numbering, the kind of signs, and the like may be different to what is shown in the present Figures.

Summarizing the technical benefits, existing algorithms/ methods for the detection and tracking of detected persons are used and improved by providing the herein discussed additional steps and configurations for improving the counting of persons from live images taken by cameras provided on a moving vehicle 1. The herein provided disclosure provides better interpretability as it can be explained by unique features of people (e.g. matrices embedded unique human features like faces, shapes, etc. extracted from each image/frame). These features are saved and compared with many distinctive features in other images to see how people are tracked. Naturally, the occlusion problem is also avoided, because the images are taken during a time series by the moving vehicle 1 so that each person is gradually exposed at least for a certain time period within the processing of the counting of persons during the approaching of the moving vehicle 1 to the predefined location. Especially, this combining of information from different images taken within a time series is a novel aspect. Further, since the sequence of images is preferably processed in a chronological order of capturing/taking images, it can be kept track of a detected person even better which leads to even more improvement with regard to avoiding mis-re-identification and the movement of persons can be followed with high reliability. Even further, the herein discussed disclosure is less complex and requires less computational burden, because it takes all data processing into one single pipeline and a real time counting of people is enabled. Further, everything from the image/video capturing to the people counting is done on board the vehicle 1 with computers installed in the control apparatus 4 and the passenger data 200 gained by the processing can be provided for further analysis in real time to a remote server 10.

Present disclosure is especially beneficial for public transportation systems, such as bus, train, tram, metro, railway, which operates between multiple platform stations and it offers an end to end system for hardware and software processing on board to dashboard functions for real-time monitoring. The system requires only small modifications to be applicable in various settings of transportation systems. The monitoring and analysis of passenger flow at a platform/ station throughout the transportation network is also possible as well as decision making in real-time for both municipality and drivers on board. Scalability to many vehicles 1 on the same network to detect and track passengers or vehicle's flow at traffic light position is also enabled with low computational effort and even further, the system can also be used for issuing a warning to the driver or to a person when persons are detected to be too close to the edge of a platform or the like, which increases the safety of a public transportation system.

As will be appreciated by one of skill in the art, the present disclosure, as described hereinabove and the accompanying figures, may be embodied as a method (e.g., a computer-implemented process or any other process), apparatus (including a device, machine, system, computer program product, and/or any other apparatus), or a combination of the foregoing. Aspects/Examples of the present disclosure may be a software entirely (including firmware, resident software, micro-code, etc.), or a combination of software and hardware aspects that may be referred to as a "system". Furthermore, the present disclosure may take the form of a computer program product on a computer-readable medium having computer-executable program code embodied in the medium.

It should be noted that arrows may be used in drawings to represent communication, transfer, or other activity involving two or more entities. Double-ended arrows generally indicate that activity may occur in both directions (e.g., a command/request in one direction with a corresponding reply back in the other direction, or peer-to-peer communications initiated by either entity), although in some situations, activity may not necessarily occur in both directions.

Single-ended arrows generally indicate activity exclusively or predominantly in one direction, although it should be noted that, in certain situations, such directional activity actually may involve activities in both directions (e.g., a message from a sender to a receiver and an acknowledgement back from the receiver to the sender, or establishment of a connection prior to a transfer and termination of the connection following the transfer). Thus, the type of arrow used in a particular drawing to represent a particular activity is exemplary and should not be seen as limiting.

The present disclosure may be described with reference to flowchart illustrations and/or block diagrams of methods and apparatuses, and with reference to a number of sample views of a graphical user interface generated by the methods and/or apparatuses. It will be understood that each block of the flowchart illustrations and/or block diagrams, and/or combinations of blocks in the flowchart illustrations and/or block diagrams, as well as the graphical user interface, can be implemented by computer-executable program code.

The computer-executable program code may be provided to a processor of a general purpose computer, special purpose computer, or other programmable data processing apparatus to produce a particular machine, such that the program code, which executes via the processor of the computer or other programmable data processing apparatus, create means for implementing the functions/acts/outputs specified in the flowchart, block diagram block or blocks, figures, and/or written description.

The computer-executable program code may also be stored in a computer-readable memory that can direct a computer or other programmable data processing apparatus to function in a particular manner, such that the program code stored in the computer readable memory produce an article of manufacture including instruction means which implement the function/act/output specified in the flowchart, block diagram block(s), figures, and/or written description.

The computer-executable program code may also be loaded onto a computer or other programmable data processing apparatus to cause a series of operational steps to be performed on the computer or other programmable apparatus to produce a computer-implemented process such that the program code which executes on the computer or other programmable apparatus provides steps for implementing the functions/acts/outputs specified in the flowchart, block diagram block(s), figures, and/or written description. Alternatively, computer program implemented steps or acts may be combined with operator or human implemented steps or acts in order to carry out an embodiment of the disclosure.

It should be noted that terms such as "server" and "processor" may be used herein to describe devices that may be used in certain aspects of the present disclosure and should not be construed to limit the present disclosure to any particular device type unless the context otherwise requires. Thus, a device may include, without limitation, a bridge, router, bridge-router (brouter), switch, node, server, computer, appliance, or other type of device. Such devices typically include one or more network interfaces for communicating over a communication network and a processor (e.g., a microprocessor with memory and other peripherals and/or application-specific hardware) configured accordingly to perform device functions.

Communication networks generally may include public and/or private networks; may include local-area, wide-area, metropolitan-area, storage, and/or other types of networks; and may employ communication technologies including, but in no way limited to, analog technologies, digital technologies, optical technologies, wireless technologies (e.g., Bluetooth), networking technologies, and internetworking technologies.

It should also be noted that devices may use communication protocols and messages (e.g., messages created, transmitted, received, stored, and/or processed by the device), and such messages may be conveyed by a communication network or medium.

Unless the context otherwise requires, the present disclosure should not be construed as being limited to any particular communication message type, communication message format, or communication protocol. Thus, a communication message generally may include, without limitation, a frame, packet, datagram, user datagram, cell, or other type of communication message.

Unless the context requires otherwise, references to specific communication protocols are exemplary, and it should be understood that alternatives may, as appropriate, employ variations of such communication protocols (e.g., modifications or extensions of the protocol that may be made from time-to-time) or other protocols either known or developed in the future.

It should also be noted that logic flows may be described herein to demonstrate various aspects of the disclosure, and should not be construed to limit the present disclosure to any particular logic flow or logic implementation. The described logic may be partitioned into different logic blocks (e.g., programs, modules, functions, or subroutines) without changing the overall results or otherwise departing from the true scope of the disclosure.

Often, logic elements may be added, modified, omitted, performed in a different order, or implemented using different logic constructs (e.g., logic gates, looping primitives, conditional logic, and other logic constructs) without changing the overall results or otherwise departing from the scope of the disclosure.

The present disclosure may be embodied in many different forms, including, but in no way limited to, a graphical processing unit as well as computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof Computer program logic implementing some or all of the described functionality is typically implemented as a set of computer program instructions that is converted into a computer executable form, stored as such in a computer readable medium, and executed by a microprocessor under the control of an operating system. Hardware-based logic implementing some or all of the described functionality may be implemented using one or more appropriately configured FPGAs.

Computer program logic implementing all or part of the functionality previously described herein may be embodied in various forms, including, but in no way limited to, a source code form, a computer executable form, and various intermediate forms (e.g., forms generated by an assembler, compiler, linker, or locator).

Source code may include a series of computer program instructions implemented in any of various programming languages (e.g., an object code, an assembly language, or a high-level language such as Fortran, python, C, C++, JAVA, JavaScript or HTML) for use with various operating systems or operating environments. The source code may define and use various data structures and communication messages. The source code may be in a computer executable form (e.g., via an interpreter), or the source code maybe converted (e.g., via a translator, assembler, or compiler) into a computer executable form.

Computer-executable program code for carrying out operations of embodiments of the present disclosure may be written in an object oriented, scripted or unscripted programming language such as Java, Perl, Smalltalk, C++, or the like. However, the computer program code for carrying out operations of aspects of the present disclosure may also be written in conventional procedural programming languages, such as the "C" programming language or similar programming languages.

Computer program logic implementing all or part of the functionality previously described herein may be executed at different times on a single processor (e.g., concurrently) or may be executed at the same or different times on multiple processors and may run under a single operating system process/thread or under different operating system processes/threads.

Thus, the term "computer process" refers generally to the execution of a set of computer program instructions regardless of whether different computer processes are executed on the same or different processors and regardless of whether different computer processes run under the same operating system process/thread or different operating system processes/threads.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device.

The computer program may be fixed in any form in a signal that is transmittable to a computer using any of various communication technologies, including, but in no way limited to, analog technologies, digital technologies, optical technologies, wireless technologies (e.g., Bluetooth), networking technologies, and internetworking technologies.

The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Any suitable computer readable medium may be utilized. The computer readable medium may be, for example but not limited to, an electronic, magnetic, optical, electromagnetic, infrared, or semiconductor system, apparatus, device, or medium.

More specific examples of the computer readable medium include, but are not limited to, an electrical connection having one or more wires or other tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device.

The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies.

The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web). Of course, some embodiments of the disclosure may be implemented as a combination of both software (e.g., a computer program product) and hardware. Still other aspects of the present disclosure are implemented as entirely hardware, or entirely software.

While certain exemplary aspects have been described and shown in the accompanying drawings, it is to be understood that such embodiments are merely illustrative of and are not restrictive on the broad disclosure, and that the aspects of the present disclosure are not limited to the specific constructions and arrangements shown and described, since various other changes, combinations, omissions, modifications and substitutions, in addition to those set forth in the above paragraphs, are possible.

Those skilled in the art will appreciate that various adaptations, modifications, and/or combination of the just described aspects and examples can be configured. Therefore, it is to be understood that, within the scope of the appended claims, the disclosure may be practiced other than as specifically described herein. For example, unless expressly stated otherwise, the steps of processes described herein may be performed in orders different from those described herein and one or more steps may be combined, split, or performed simultaneously. Those skilled in the art will also appreciate, in view of this disclosure, that different aspects or examples of the disclosure described herein may be combined to form other aspects or examples of the disclosure.

The invention claimed is:

1. A method for counting a number of persons at a predefined location, the method comprising:
   receiving a time series of images taken by one or more cameras mounted at a transportation vehicle;
   and performing for each image the following steps of:
   detect one or more persons in the received image,
   place a boundary box around each detected person, and
   provide a window of interest in the image and apply a filtering condition for selecting each boundary box in the window of interest that matches the filtering condition;
   wherein the method further comprises:
   track each selected boundary box in the window of interest in all received images and count the number of persons based on comparisons between the detected persons in the selected boundary boxes, and
   wherein the filtering condition is a ratio of an area of a boundary box which intersects with the window of interest and an area of the window of interest, and wherein the filtering condition is defined to be met when a value of the ratio is equal to or larger than a minimum value.

2. The method according to claim 1, wherein the predefined location is defined by predefined position coordinates and the cameras of the transportation vehicle are configured to take one or more images while the transportation vehicle is approaching the predefined location within a predefined distance from the predefined location, wherein the window of interest is placed in each received image such that it includes a section of the surroundings of the predefined location within a predefined or a dynamically set range from the camera of the transportation vehicle.

3. The method according to claim 2, wherein the predefined location is a station of a public transportation system.

4. The method according to claim 1, wherein a unique ID is assigned to each boundary box of a detected person and the counting of persons is performed by counting the number of unique IDs present in the received images.

5. The method according to claim 1, wherein the window of interest is adapted in regard of its size and its position within each received image for each image based on window of interest parameters which are provided by a trained machine learning unit, which is trained based on a ground truth data and test data sequences.

6. The method according to claim 1, wherein the filtering condition is adapted based on filtering condition parameters received from a trained machine learning unit, which is trained based on a ground truth data and test data sequences.

7. The method according to claim 1, wherein predefined features of detected persons are extracted and compared to each other for tracking each boundary box over the received images.

8. The method according to claim 1, wherein placing the window of interest and applying the filtering condition to each of the images, and an optimization of parameters of the window of interest and parameters of the filtering condition are repeated in a processing loop.

9. A control apparatus comprising:
input and output units for receiving a time series of images taken by one or more cameras mounted at a transportation vehicle,
a person detection unit configured to detect persons in an image to provide a boundary box around each detected person in the image,
a window of interest setting unit configured to set a window of interest in a received image,
a filtering unit configured to apply a filtering condition for determining which of the boundary boxes are to be selected within the window of interest,
a tracking unit configured to match boundary boxes of the detected persons in the window of interest in each received image, and
a counting unit which is configured to count the number of the detected people based on comparisons between the detected people in the selected boundary boxes,
wherein the filtering condition is a ratio of an area of a boundary box which intersects with the window of interest and an area of the window of interest, and wherein the filtering condition is defined to be met when a value of the ratio is equal to or larger than a minimum value.

10. A non-transitory computer-readable medium storing a computer program product configured to carry out the method of claim 1 when executed by a computer.

11. A system including the control apparatus of claim 9, a localization unit mounted at a transportation vehicle, one or more cameras mounted at the transportation vehicle, and
a remote computer which is connected to the control apparatus via a wireless data connection.

* * * * *